(No Model.)
F. B. RAE.
CURRENT INDICATOR.
No. 426,065. Patented Apr. 22, 1890.
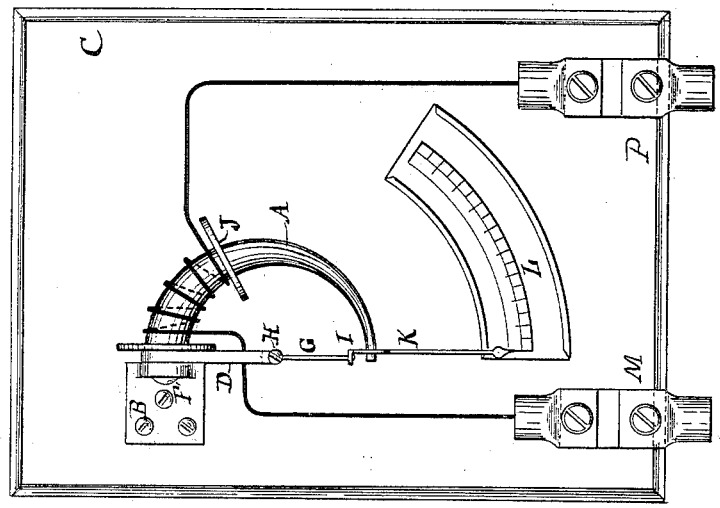
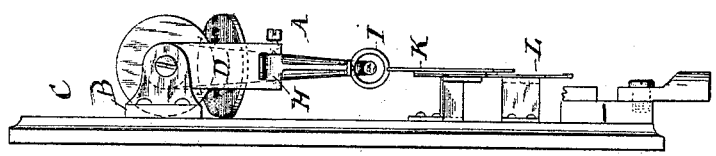
WITNESSES
INVENTOR

UNITED STATES PATENT OFFICE.

FRANK B. RAE, OF DETROIT, MICHIGAN.

CURRENT-INDICATOR.

SPECIFICATION forming part of Letters Patent No. 426,065, dated April 22, 1890.

Application filed January 14, 1890. Serial No. 336,912. (No model.)

*To all whom it may concern:*

Be it known that I, FRANK B. RAE, a citizen of the United States, residing at Detroit, in the county of Wayne and State of Michigan, have invented certain new and useful Improvements in Current-Indicators, of which the following is a specification.

My invention relates to that class of devices by means of which the flow of electric currents and the changes thereof through an electric conductor may be indicated upon a properly-divided scale or registered on a proper medium through the force exerted by said current in the coils of an electro-magnet upon an armature placed within the influence of said magnet.

The object of my invention is to provide a simple, cheap, and effective means for measuring or indicating the electric energy or strength of the current passing through any particular conductor, and which shall show at once the changes which shall take place in the current strength in the circuit, which includes the device, and which changes may, if desired, be recorded permanently.

I have shown in the present instance my invention applied to what is termed in the art an "ammeter," and in the accompanying drawings I have illustrated the preferred embodiment of the invention.

In said drawings, Figure 1 is a side view of the instrument, and Fig. 2 is a plan view thereof.

My invention consists, generally, in an electro-magnet of peculiar form and construction, the coils of which are included in the circuit through which the current to be measured or indicated is passing. The armature of this magnet is connected with suitable mechanism, as a pointer or registering-instrument, which, in connection with a suitable scale or equivalent, will indicate or record the variations in the strength of the current passing through the coils of the magnet. The armature is arranged so as to be held normally in a position where it will be under the influence of the field or lines of force of the magnet, and the variations of the strength of the current passing through the coils of the magnet will cause the magnet to attract the armature with greater or less strength, in accordance with the variations of that current, and will indicate such variations or record them, as the case may be.

In carrying out my invention I provide a suitable base C, to which are attached the binding-posts or terminals P and M of the circuit the strength of the current of which is to be measured or indicated. Mounted upon the base-piece and supported in a bracket or casting B is a semicircular core-piece A, preferably made of wrought-iron and having a gradually-tapering cross-section from its base to its free end. Between the base of this core-piece and the bracket B is placed a piece or plate D, preferably of soft iron, and having a width substantially equal to the large end of the core-piece and a length somewhat greater than the radius of said piece, and this is interposed between the large end of the core-piece and the bracket, and the whole is suitably secured together, as by an iron screw F. The free end of this plate terminates at the center of a circle, the circumference of which includes the curved piece, and in the end of this plate is suitably mounted, as by a hinged joint, a soft-iron armature G, the bearing portion of which is enlarged and rounded, as shown, so that it will present practically the same surface to the plate in whatever position the armature may assume under the action of the current. To the free end of this armature-piece G is attached a ring I of soft iron, the ring having an inner diameter equal to the diameter of the curved piece at the point J adjacent to the coils. Attached to the ring I is a pointer K, preferably of non-magnetic material and as light as possible, and this pointer normally rests over the zero-point of a scale L in the form of a segment; or, when the instrument is desired to be used as a register, the pointer may be provided with any of the usual means for registering its movements, none being shown herein, as they are common in this class of devices.

Such being the general construction of the apparatus, its action will be clearly understood. Upon the current passing through the coils surrounding the core-piece, the armature and ring will be attracted, and, swinging on its pivot, the pointer will move over the scale and indicate thereon the strength of the current flowing through the conductor. It will be understood, of course, that the shape of the core-piece A and its variation in cross-section from its point toward its base is such that the attractive effect upon the armature and ring will not be in direct proportion to the strength of the current passing through the coils, but will increase directly as the pull exerted by gravity increases with the angle of swing, and the scale being divided in accordance therewith it is simply necessary to glance at the position of the pointer in relation to the scale to determine the strength of the current flowing through the conductor.

It will be evident to those skilled in the art that the details of construction and the form and proportions of the parts may be varied, according to the requirements of the particular work for which the device is to be used, and I therefore do not limit myself to the precise construction and arrangement shown.

What I claim is—

1. A current-indicator consisting of a magnet, the coils of which are included in the circuit to be measured, a tapering core-piece for the magnet, and a pivoted armature embracing the tapering core-piece and carrying a pointer, substantially as described.

2. A current-indicator consisting of an electro-magnet, the coils of which are included in the circuit to be measured, a semicircular core-piece for said magnet, tapering toward its extremity, and an armature having a ring embracing the tapering core-piece and carrying an indicating-point, substantially as described.

3. A current-indicator consisting of an electro-magnet, the coils of which are included in the circuit to be measured, a semicircular core-piece tapering from its base to its free end, a plate connected to the base and extending toward the free end of the core-piece, an armature pivoted to the plate and carrying a ring-shaped piece of soft iron embracing the core-piece, and an indicator attached thereto, substantially as described.

4. A current-indicator consisting of an electro-magnet, the coils of which are in the circuit to be measured, a semicircular core-piece gradually tapering toward its free end, a soft-iron plate secured to the base of the core adjacent to the coils, an armature pivoted in said soft-iron plate, a ring of soft iron secured to the armature and embracing the free end of the core, a pointer secured to the ring, and a segmental scale for the pointer, substantially as described.

In testimony whereof I have signed my name to this specification in the presence of two subscribing witnesses.

FRANK B. RAE.

Witnesses:
D. W. BRADFORD,
HENRY F. DE B. CAMERON.